United States Patent [19]

Boitana

[11] Patent Number: 5,305,456
[45] Date of Patent: Apr. 19, 1994

[54] APPARATUS AND METHOD FOR COMPUTER SYSTEM INTEGRATED SECURITY

[75] Inventor: George A. Boitana, Jamaica Plain, Mass.

[73] Assignee: Security Integration, Inc., Lexington, Mass.

[21] Appl. No.: 775,294

[22] Filed: Oct. 11, 1991

[51] Int. Cl.$^5$ .............................................. G06F 9/44
[52] U.S. Cl. ............................. 395/700; 364/DIG. 1; 364/280; 364/285; 364/285.4; 364/286; 364/286.4
[58] Field of Search ...................... 395/700, 650, 375; 380/25, 48, 49, 4, 46, 50

[56] References Cited

U.S. PATENT DOCUMENTS

| | | | |
|---|---|---|---|
| 4,104,721 | 8/1978 | Markstein et al. | 395/375 |
| 4,558,175 | 12/1985 | Arnold et al. | 380/4 |
| 4,882,752 | 11/1989 | Lindman et al. | 380/25 |
| 4,941,175 | 7/1990 | Enescu et al. | 380/4 |
| 4,951,249 | 8/1990 | McClung et al. | 380/4 |
| 4,984,272 | 1/1991 | McIlroy et al. | 380/25 |
| 5,073,933 | 12/1991 | Rosenthal | 380/25 |
| 5,182,770 | 1/1993 | Medveczky et al. | 380/4 |

OTHER PUBLICATIONS

Highland, H. J., "Data Protection in a Microcomputer Environment," *Computer Security: A Global Challenge*, Proceedings of the Second IFIP International Conference on Computer Security, IFIP/Sec '84, Toronto, Ont., Can. Sep. 10–12, 1984, pp. 517–531.
Highland, H. J., "Microcomputer Security: Data Protection Techniques," *Computers & Security*, vol. 4, No. 2, Jun. 1985, pp. 123–134.
Hindin, H. J., "Microcomputer and Mainframe Ally to Bring Offices New Power," *Electronics*, vol. 56, No. 16, Aug. 11, 1983, pp. 105–107.
Ambrosio, J., "Security Issues Get a Lock on User's Attention," *Computerworld*, vol. 24, No. 29, Jul. 16, 1990, p. 10.
Abraham, D. G., et al., "Transaction Security Systems," *IBM Systems Journal*, vol. 30, No. 2, 1991, pp. 206–229.
Anon, "Bank Keeps Tabe on Data With Mainframe Security Tool," *Computerworld*, vol. 18, No. 42, Oct. 15, 1984, p. 50.
Nov. 1, 1990 letter from John W. Dunlap Jr. of COM/Energy Services Company to Tom E. Ball of Dun & Bradstreet Software.
Security Integration Group's promotional leaflet, Sep., 1990.
Security Integration Group's brochure entitled "The Security Bridge," Jul., 1990.
Security Integration Group's brochure entitled "The Security Bridge Presented by the Security Integration Group," Jul., 1990.
Jun. 17, 1991 letter from Bob Neyer of St. Johns River Power Park to John Mulcahy of Security Integration Group.
Sep. 16, 1991 letter from Paul G. Dennehy of Ciba Corning Diagnostics Corp. to John Mulcahy of Security Integration Group.
Feb. 24, 1992 letter from John C. Kane of Commonwealth Energy System to John Mulcahy of Security Integration Group.
Security Integration Groups's flyer entitled "Its Time for Good News About Computer Security," 1991, reprint from "Computer World".

*Primary Examiner*—Kevin A. Kriess
*Attorney, Agent, or Firm*—Hamilton, Brook, Smith & Reynolds

[57] ABSTRACT

Computer system security apparatus and method extends control of operating system security into an application. An application control component intercepts and interprets the security processing of application security software of an application. An interface member formats calls to the operating system security using parameters defined by the application control component. The interface member passes results of the operating system security calls back to the application control component for enforcement thereof. For applications running on different platforms/computers, the apparatus and method extends control of the operating system of a mainframe into those applications running on devices networked to the mainframe. The mainframe thus functions as a security server which distributes security functionality to numerous applications running on diverse platforms.

14 Claims, 7 Drawing Sheets

APPARATUS AND METHOD FOR COMPUTER SYSTEM INTEGRATED SECURITY

MICROFICHE APPENDIX

A computer program listing is included in a microfiche appendix having one microfiche including 23 frames. The listing is for a software embodiment of the computer system security of the present invention.

A portion of the disclosure of the patent document contains material which is subject to copyright protection. The copyright owner has no objections to the facsimile reproduction by any one Of the patent document or the patent disclosure, as it appears in the Patent and Trademark Office patent file or records, but otherwise reserves all copyrights what so ever.

BACKGROUND OF THE INVENTION

Generally a computer system is formed of five major functional parts: input assembly, memory, arithmetic and logic circuitry, output assembly and control unit. The input assembly includes devices such as a keyboard and/or mouse which transfer information between user and computer memory. The information is stored in memory and subsequentially fetched by user programs for processing by the arithmetic and logic circuitry. That is, the arithmetic and logic circuitry performs operations on stored data according to a memory stored user program (i.e., a set of processing steps). Results of this processing are made accessible to a user through the output assembly which includes devices such as a display unit (CRT), printer and the like. The control unit coordinates the foregoing actions of the input assembly, memory, arithmetic and logic circuitry and output assembly, by transmitting timing and control signals to these parts.

Typically the arithmetic and logic circuitry and the control unit are referred together as the central processing unit (CPU) . Also, the input assembly and output assembly are commonly combined under the term "I/O devices". Various bus structures or channels are used to interconnect the different parts.

Depending on size, speed and cost, computers are called "minicomputers" (for low cost, size and computing power), "microcomputers" or PC's (for small machines, of low cost, formed of large scale integrated circuits), or "mainframes" (for large, expensive and increased computing power). Generally minicomputers or microcomputers are used by individuals in domestic and small-scale commercial situations for example, while mainframes are used almost exclusively in industry and for commercial purposes.

User programs are programs which allow users to manipulate and process desired information to solve applicable problems, and hence are commonly referred to as a computer application. Software for general ledger bookkeeping, word processing, and controlling inventory are examples of popular mainframe computer applications. Application security is the component of a computer application that controls user access to specific data and functions of the application.

Computer system programs or systems software is distinguished from user programs/computer applications and include programs that translate user programs into machine language, programs that load translated programs into memory, and operating system programs. Operating system programs (or more commonly "the operating system") are a set of routines that manage the operation of the CPU, memory, I/O devices and other physical resources of the computer system. In particular, the operating system supervises the sharing of the CPU (and I/O devices) among a number of independent user programs/applications so that the computer system is utilized as efficiently as possible. Ease of use for computer users must be balanced against the efficiency of the operating system software. This tradeoff often results in computer users experiencing difficulty in accessing and using application programs. One example of this is shown in the use of operating system security programs in conjunction with application security.

Of particular interest is the operating system security software. The operating system security software is a component of the operating system which controls global user access to large information structures such as files, and to large program structures such as applications. The Resource Access Control Facility (RACF), the Access Control Facility Two (ACF2) and Top-Secret Security (TSS) are examples of popular operating system security software packages. Most mainframe computer environments currently use both application security and operating system security programs. While the operating system security software controls global access to applications and to files, the application security controls granular access to application specific subfunctions and to smaller information structures, such as records or fields. This relationship is illustrated in FIG. 1.

As shown in FIG. 1, a user accesses an application 13, for example a general ledger user program, through the operating system security 11. In particular, the user employs an ID/password combination for which the operating system security 11 allows access to the application 13. Once the user has accessed the application 13, functions 19 and records 17 (e.g., illustrated Function 1, Function 2, Function 3 and/or Record 1, Record 2, Record 3) are accessed by the user through the application security 15. Specifically, the user employs a separate ID/password recognized by the application security 15 for accessing the functions 19 and records 17 of the application 13. In addition, to access the master file 38 of the general ledger application 13 the user must go through the operating system security 11.

To that end, a user must remember an operating system user-ID/password combination plus a number of application security user-ID/password combinations corresponding to every application the user must access. Further, security administration is complicated and expensive due to the split security configuration of the computer system. That is, each user of the computer system must be given ID/password under the operating system security as well as an ID/password under application security for desired applications. Different users will need different ID/passwords for the operating system security as well as for the application security where some users are allowed access to certain applications and other users allowed access to other applications. Further, such split security configurations are difficult to audit, and the difficulty of administration often results in security exposures, data corruption and computer fraud.

Therefore there is need for improvement in the operating system security and application security configuration of computer systems.

SUMMARY OF THE INVENTION

The present invention provides an apparatus and method for computer system security which overcomes the problems of prior art. In particular, the present invention provides apparatus and method for extending the control of the operating system security software into an application, thereby replacing the application security component. In addition, the present invention apparatus and method standardizes security for all applications running on the computer system, thus centralizing all security control within the operating system security software. Further, the present invention apparatus and method extends the control of the operating system security software into applications running on devices networked to the computer system. The computer system thus performs the roll of a security server which distributes security functionality to numerous applications running on diverse platforms (i.e., different computers/operating systems).

Accordingly, the present invention provides an efficient and effective method of completely protecting information stored on a computer system and connected devices. By centralizing all security processing within the computer system operating system security software, the present invention prevents unauthorized data disclosure and corruption and greatly facilitates data security administration. These benefits are especially evident on mainframe computer systems as seen in one embodiment.

In a preferred embodiment, the present invention computer security apparatus employs an operating system program which provides secured access to application specific data and functions.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are for illustrating the principles of the invention.

DETAILED DESCRIPTION OF THE PREFERRED EMBODIMENT

The present invention provides an integration of operating system security and application security in a computer system. The benefits of such security integration are as follows.

Each user only has to remember a single user-ID/password combination.

Security administration becomes much easier and requires fewer, less specialized personnel.

All security administration is centralized in one department, eliminating the need to coordinate security changes, reducing the potential for human error, and increasing the amount of time for which the computer system is usable.

All security administration is centralized in one software system, eliminating the need to coordinate security changes between the application and operating system security components and reducing the potential for human error.

In particular, in a preferred embodiment the security integration of the present invention extends the operating system security software to replace the application security software. Additional benefits are as follows.

The operating system security software provides a comprehensive audit trail of successful and unsuccessful attempts to access data. This significantly reduces to potential liability associated with computer fraud and greatly facilitates and standardizes computer audit activities.

The operating system security software provides important security functionality often absent in application security such as the ability to distinguish between inquiry and update activities, and the ability to secure application functions not protected under application security.

Being external to applications, the operating system security provides the most technically sophisticated mechanism for data protection, including complex password encryption, forced password changes, total suspension of users for excessive or suspicious security violations, comprehensive violation logs, immediate computer operator notification of suspicious activity, and numerous other features designed to eliminate computer fraud and reduce losses due to human error. These features are almost entirely absent in application security components.

Figure 5:
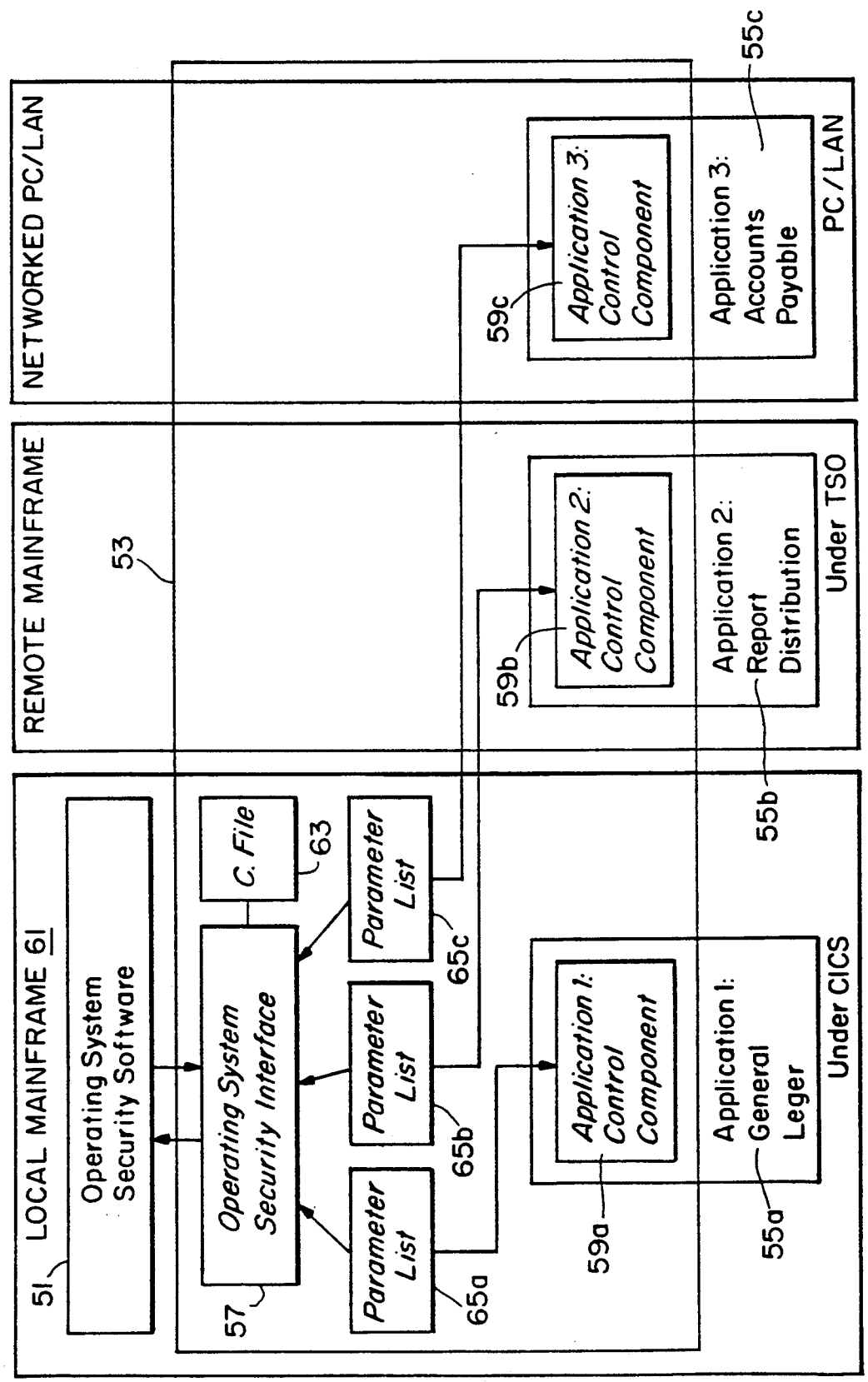
FIG. 5 is a block diagram of an embodiment of the present invention computer system security apparatus.

The foregoing is accomplished in a general embodiment of the present invention as illustrated in FIG. 5. In a mainframe environment 61, a security integration apparatus 53 of the present invention isocoupled to the operating system security software 51 to extend control of the operating system security into specific (desired) applications 55a, b, c. Each of these applications 55a, b, c runs on mainframe 61 or a respective computer system. For example, application 55a runs under CICS (Customer Information Control System), application 55b runs under TSO (Time Sharing Option) on a remote mainframe, and application 55c runs on PCs networked to the mainframe 61. The security integration apparatus 53 is formed of a plurality of application control components 59 (one for each desired application 55) and an operating system security interface component 57 which is central to each application control component 59.

Each application control component 59 communicates between a different and specific application 55 and the operating system security interface 57. Thus, different version of an application control component 59 is required for each application 59 subject to security integration of the present invention. In all versions, the application control component 59 intercepts application security processing of the respective application 55, interprets the security requests made by the application security software of the respective application 55, and formats a call to the operating system security interface 57. After the operating system security interface 57 returns a reply to the calling application control component 59, the application control component 59 enforces the result with the respective application 55.

Because each application control component 59 is specific to its associated (i.e., respective) application 55, the methods used by the different application control components 59 to perform the foregoing functions varies from application 55 to application 55. In all cases, the primary tasks of each application control component 59 are to bypass the security component of the associated application 55, call the operating system security interface 57, and enforce the results of that call. This is accomplished in the preferred embodiment by each application control component 59 performing the functions of:

INTERCEPT: This function preempts normal application security processing. This is done either by application user-exits, or by replacing specific application security modules, or by changing application flow to invoke the application control component.

INTERPRET: This function determines the type of security requests and the name of the resource to which the user is requesting access. The function then supplies all appropriate information in a standard parameter list (discussed later), including addresses to operating system security control blocks.

CALL: This function invokes the operating system security interface 57 by passing a parameter list and requesting either (i) "verify", to determine whether a user has access to a given resource, or (ii) "extract", to acquire user data from the operating system security software database, for example, a full user name.

ENFORCE: Based on the operating system security interface 57 result, as passed back in the parameter list, this function either allows or denies access. The function then modifies the associated application 55 program flow, if necessary.

Program language of the application control components 59 may either be assembler, COBOL, or any other supported language. Further, each application control component 59 may or may not be reentrant. Each application control component 59 runs in the address space or platform of the application 55 that it is servicing, i.e., the respective associated application. Each application control component 59 may or may not read a cross-referencing table called the customization file (described later), depending on the requirements of the specific associated application 55.

A non-limiting example of a computer program implementation of an application control component 59 of the present invention is provided in the microfiche appendix, frames 2-18. That program is written in COBOL and determines resource names to be verified, calls the operating system security interface, and enforces the result. Each of the basic functions of an application control component 59 is illustrated in the program.

Referring back to FIG. 5, the operating system security interface component 57 of the present invention apparatus handles the two types of requests ("verify", or "extract") from the application control components 59 mentioned above. Generally, in response to a verify request, based on information supplied by the requesting application control component 59, the operating system security interface 57 requests the operating system security 51 to validate access to an application resource. The operating system security interface 57 then communicates the result of the validation request to the requesting application control component 59.

More specifically, each application control component 59 passes a standard parameter list 65 to the operating system security interface 57 upon a call to the interface. The operating system security interface 57 uses the contents of the parameter list 65 to locate an application entry in the cross-referencing information table called customization file 63 (described later). The operating system security interface 57 obtains from the customization file 63 the information index for the requesting application control component 59 as specified in the parameter list 65. Using the obtained customization file information and the parameter list 65, the operating system security interface 57 formats a call to the operating system security software 51 (e.g., RACF, ACF2 or TSS). The operating system security interface 57 then places the results of that call in the parameter list 65 and terminates the request from the application control component 59 which initially passed the parameter list 65.

In response to "extract" requests from application control components 59, the operating system interface 57 extracts user information from the operating system security database and transmits (returns) the extracted information to the requesting application control component 59. Other peripheral functions of the operating system security interface 57 include the generation of special audit trails and user access reports. To that end, this interface 57 acts as a centralized all purpose translator between the various application control components 59 on one side and any type of operating system security software 51 on the other.

In a preferred embodiment the operating system security interface 57 is a reentrant assembler language module (software routine) which may run either in its own MVS (multiple virtual storage operating system) address space or within the address space of another application. If several applications are subject to security integration by the present invention apparatus 53, this interface 57 is run in its own address space in mainframe 61 memory.

A non-limiting example of a computer program implementing an operating system security interface 57 of the present invention is provided in the microfiche appendix, frames 19-21. That program is called by each application control component 59 of the present invention to communicate with the operating system security software 51. The program performs either of two routines. The main routine checks with the operating system security software 51 the validity of a user request for access to a resource in response to the "verify" requests from application control components 59. In response to "extract" requests from application control components 59, the second program routine extracts information from the operating system security database, such as user name or department. The parameter list 65 contains the type of request and the appropriate return fields for this program.

Communication between the operating system security interface 57 and the application control components 59 takes place either through MVS cross memory services, MVS system request blocks, or through VTAM LU 6.2 (Virtual Telecommunications Access Method Logical Unit 6.2) services. The latter option is most applicable to the security integration of applications 55b, and 55c running on devices networked to the mainframe 61 such as minicomputers or personal computers. If the operating system security interface 57 is running within the application address space, communication is by a static assembler call instruction. Regardless of the type of communication used, the same parameter list 65 is passed and the operating system security interface 57 performs the same basic functions.

The parameter list 65 in the preferred embodiment is generally configured as illustrated in the microfiche appendix, frame 21. The frame shows the computer program listing of one implementation of the parameter list 65 as used for present invention integration of RACF, ACF2, and TSS operating system security software with any application security having an application control component 59 of the present invention. It is understood that other implementations of the parameter list 65 are suitable.

As mentioned above a customization file 63 is read by both the operating system interface 57 and the application control components 59. The customization file 63 is formed of several classes of information. In a preferred embodiment, the classes of information stored in the customization file 63 include:

System information which is general information about the operating environment, such as the operating system security software 51 and the method of communication between the operating system security interface 57 and application control components 59. This information is generally used only by the operating system security interface 57.

Application information including general information about the applications to be integrated and the application environments (CICS, TSO, etc.). This information is used by both the operating security interface 57 and the application control components 59.

Subfunction information including application-specific information concerning the granularity of security control, unsecured functions, etc. This information is generally used only by the application control components 59.

The foregoing information is obtained from the user via an online customization system.

Figure 6:
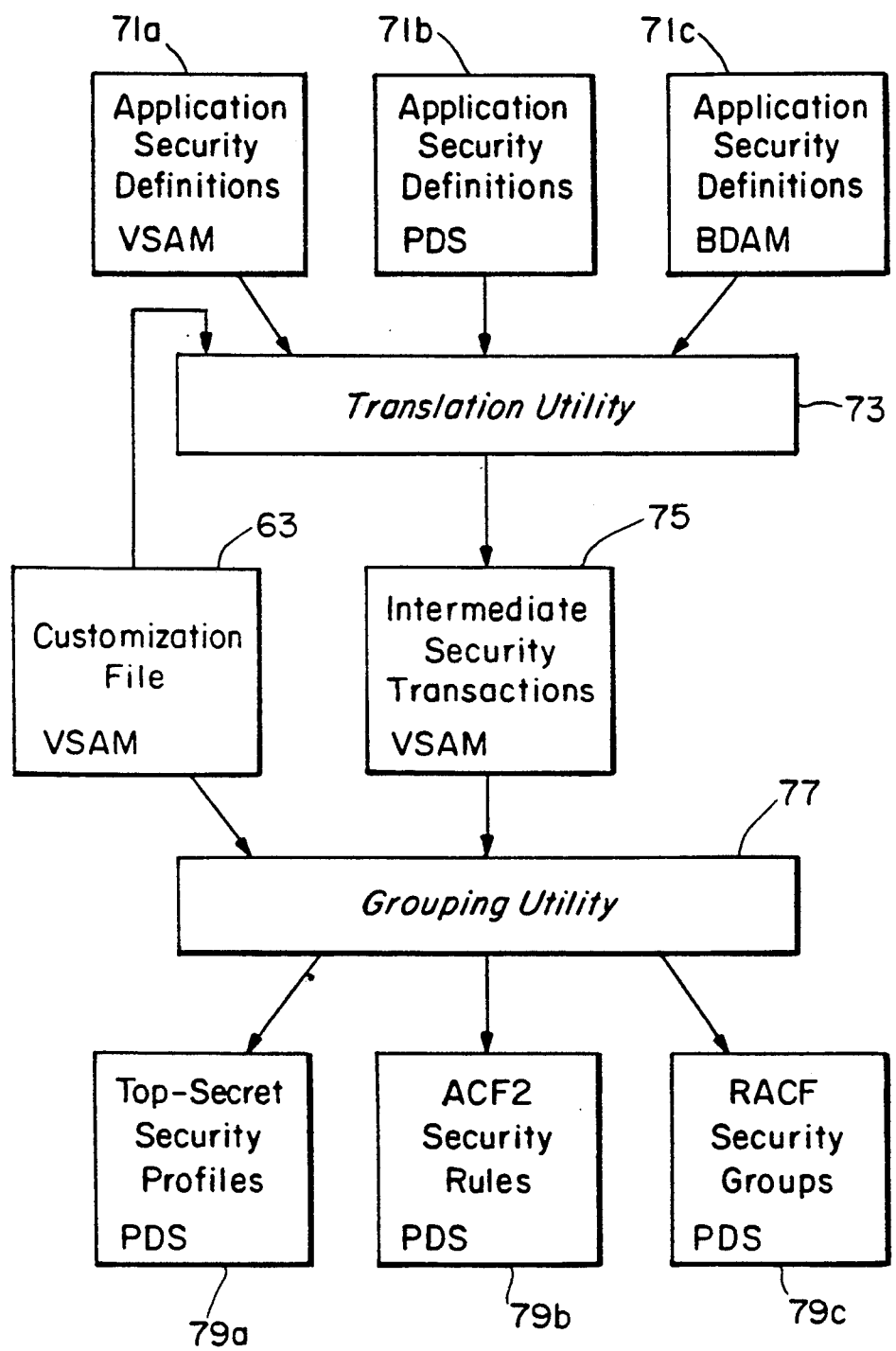
FIG. 6 is a block diagram illustrating conversion utilities to translate application security definitions to operating system definitions employed in the present invention.

The conversion utilities are preferably batch, COBOL programs which analyze current application security definitions and translate them into operating systems security 51 definitions. In particular, the conversion utilities employ (a) an application specific "application interpreter utility" 73, and (b) a "grouping utility" 77 illustrated in FIG. 6.

The application interpreter (or translation) utility 73 reads a respective application security file 71 and creates intermediate tables 75 which describe the application security structure. Each application 55 subject to security integration of the present invention requires a different (respective) application interpreter utility 73.

The grouping utility 77 takes the tables 75 output from the application interpreter utilities 73 and creates operating system security software 51 resource definitions 79. These definitions 79 are then corrected and modified by a security administrator before being input into the operating security system 51.

The customization system runs on either a CICS or TSO application. In both cases, the customization system prompts the security administrator for the desired classes of information listed above. The retrieved information is stored on the custom nation file 63 for subsequent reading by the operating system security interface 57 and application control components 59.

For purposes of illustration and not limitation, an example customization system and customization file 63 is given in "Security Bridge Version 1.2 Customization System Guide" by the Security Integration Group, Inc. of Sudbury, Mass. That guide is herein incorporated by reference (copy attached).

The foregoing description of a preferred embodiment of the present invention is in terms of software components. It is understood that these components may be implemented in hardware or a combination of hardware and software. Operation of the present invention security integration apparatus 53 is then as follows. The following examples are for purposes of illustration and not limitation.

Example I

Security Integration of one Application

Figure 1:
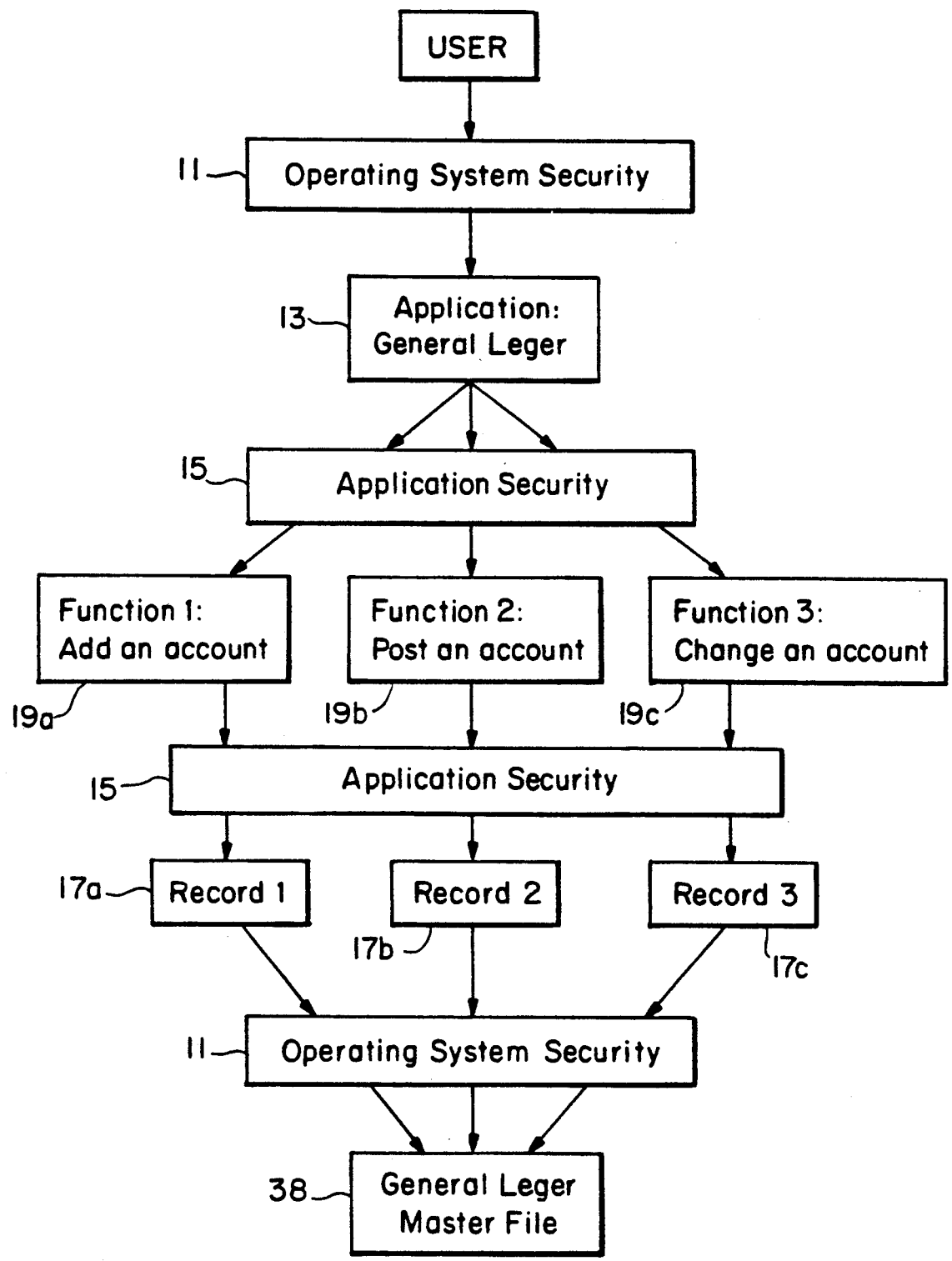
FIG. 1 is a flow diagram of operating system and security and application security in a computer system of the prior art.
Figure 2:
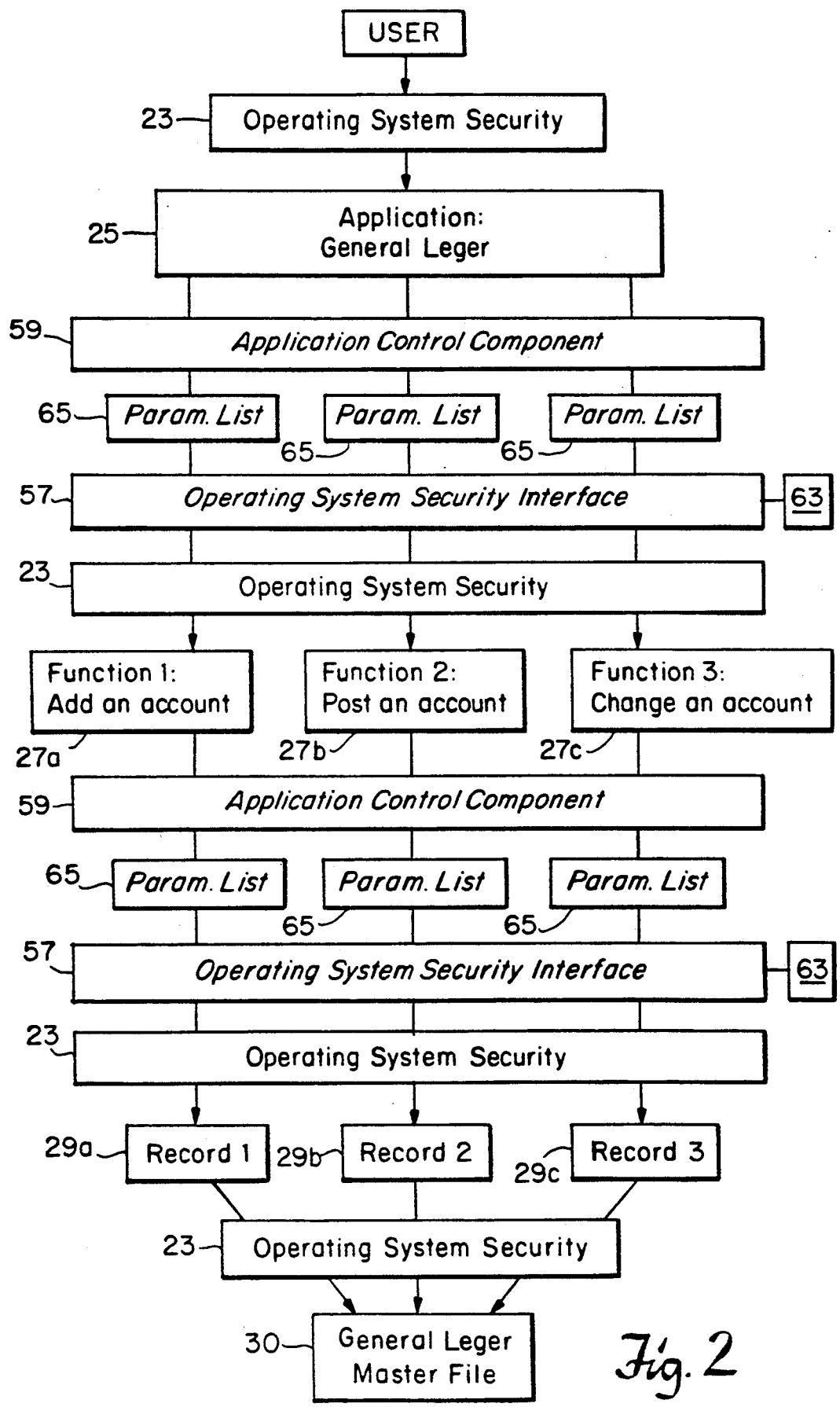
FIG. 2 is a flow diagram of an integrated security configuration of the present invention as applied to one application of a computer system.

In FIG. 2, a mainframe operating system security software 23 employing the security integration apparatus of the present invention is illustrated. The operating system security software 23 controls global access to an application 25 in the same manner as that discussed in FIG. 1. Upon application security requests for access to application-specific functions 27a, b, c and/or to records 29a, b, c or fields therein, the application control component 59 for application 25 performs the following functions. The application control component 59 intercepts application 25 security processing by, for example, an application user-exit. The application control component 59 then interprets the requests made by the application 25 security and the name of the resource to which the application user is requesting access. From this interpretation, the application control component 59 formats and completes a parameter list 65 including necessary addresses and the like. The application control component 59 then invokes the operating system security interface 57 with a "verify" call. Along with that call, the application control component 59 passes the completed parameter list 65 to the operating system security interface 57.

In response, the operating system security interface 57 formats a call to the operating system security software 23. The operating system security interface 57 accomplishes this by using information in the parameter list 65 received from the application control component 59 and information in the customization file 63 residing in memory of the operating system or on an attached data storage device. The operating system security software 23 returns results of that call to the operating system security interface 57. The operating security interface 57 places the received results in the parameter list 65 and passes the parameter list back to the application control component 59, thus terminating the "verify" call/request.

Based on the operating system security interface results passed back in the parameter list 65, the application control component 59 allows or denies resource access accordingly. In turn, the application control component 59 also modifies application 25 program flow as necessary.

Access of the application master file 30 is accomplished by the operating system security 23 in the same manner as that described in FIG. 1.

Thus in the foregoing example the application 25 security was integrated with the operating system security 23 so that a single security component controlled both global access to application 25 and the master file 30 thereof as well as granular access to application-specific functions 27a, b, c and smaller information structures such as records 29a, b, c.

Example II

Security Integration for a Mainframe with Multiple Applications

Figure 3A:
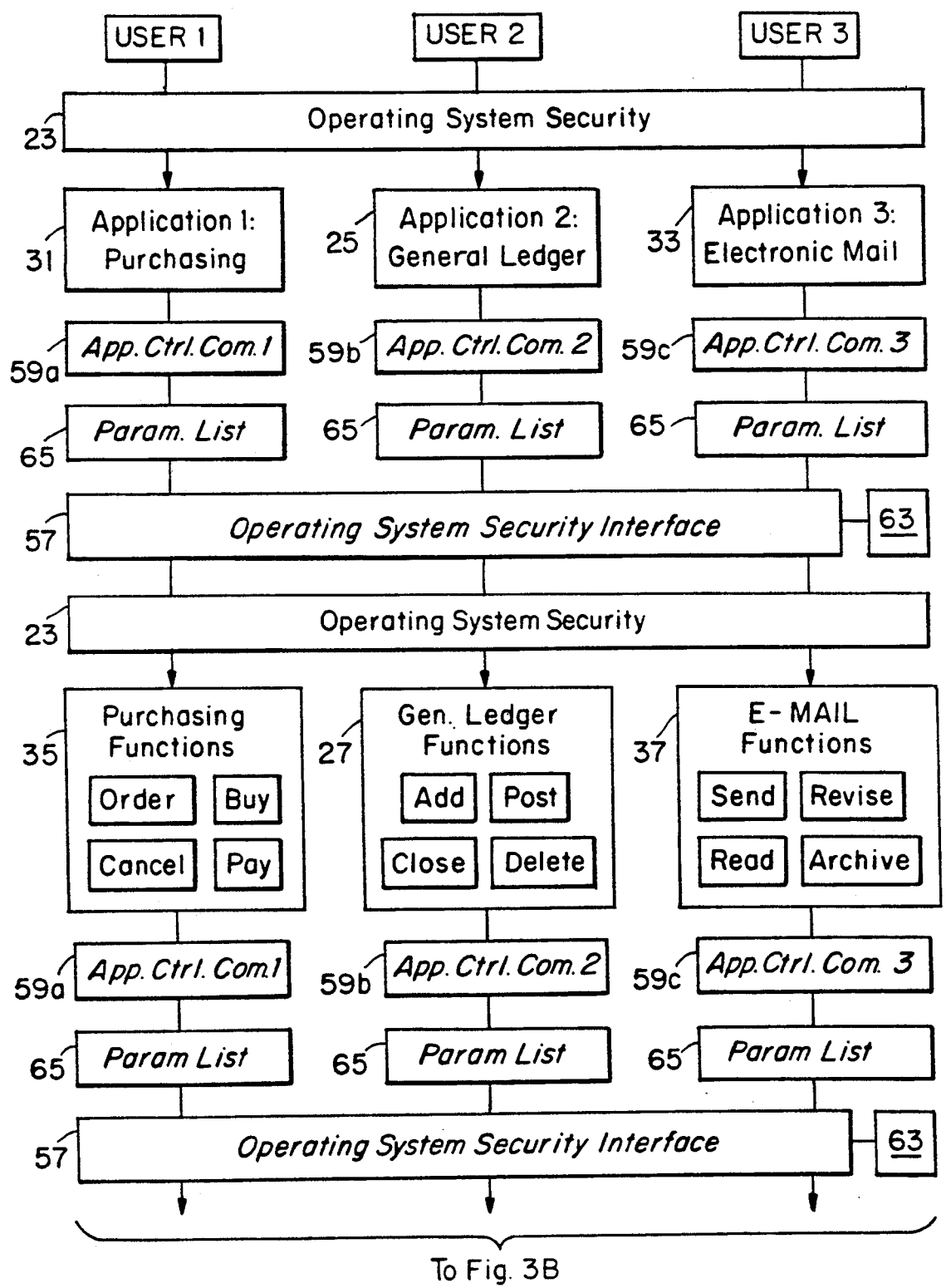
FIGS. 3A and 3B are flow diagrams of an integrated security configuration of the present invention for multiple applications running on a mainframe computer.
Figure 3B:
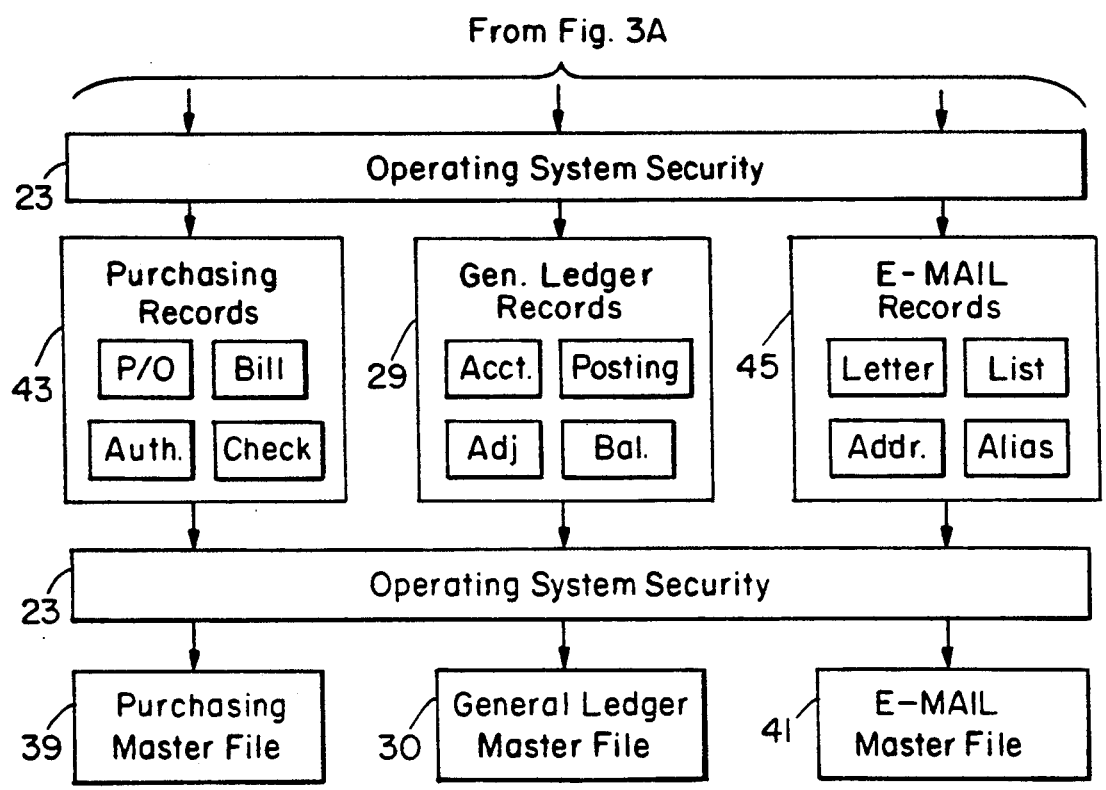

The operating system security software 23 of FIG. 2 employing the security integration apparatus of the present invention is applied to all applications running on a mainframe computer in FIG. 3. In this example the security integration apparatus of the present invention standardizes security for each of the multiple applications running on the mainframe, thus centralizing all security control within the operating system security software 23.

Referring to the illustration of FIG. 3, other applications 31, 33 in addition to the application 25 of FIG. 2 are illustrated as being supported on a mainframe computer. The operating system security software 23 provides user access of each of these applications 25, 31, 33 in a similar manner as that described for a single application in FIGS. 1 and 2. For each application, a respective application control component 59 interprets requests and security (control) processing for accessing application-specific information (e.g., functions 27, 35, 37 and records 29, 43, 45). That is, the application control component 59 of application 31 intercepts and interprets security processing by application 31 security for accessing functions 35 and/or records 43. The application control component 59 of application 25 intercepts and interprets security processing by application 25 security for accessing functions 27 and/or records 29. And, the application control component 59 of application 33 intercepts and interprets security processing by application 33 security for accessing functions 37 and/or records 45. In turn, each respective application control component 59 establishes parameters and forms a respective parameter list 65 from the intercepted and interpreted security processing.

Next, the different application control components 59 invoke respective "verify" calls and pass respective formed parameter lists 65 to the operating system security interface 57. In response, the operating system security interface 57 formats pertinent calls to the operating system security 23 for accessing the requested application specific information. The operating system security 23 responds with an allowance or denial of access which the operating system security interface 57 passes back (returns) in the respective parameter list 65 to the requesting application control component 59. Based on the returned results, the application control component 59 enforces pertinent access or modifies program flow of the associated application 25, 31, 33.

Access to master files 30, 39, 41 of the applications 25, 31, 33 respectively is provided through operating system security 23 as described in FIGS. 1 and 2.

Example III

Security Integration in a Distributed Processing Environment

Figure 4:
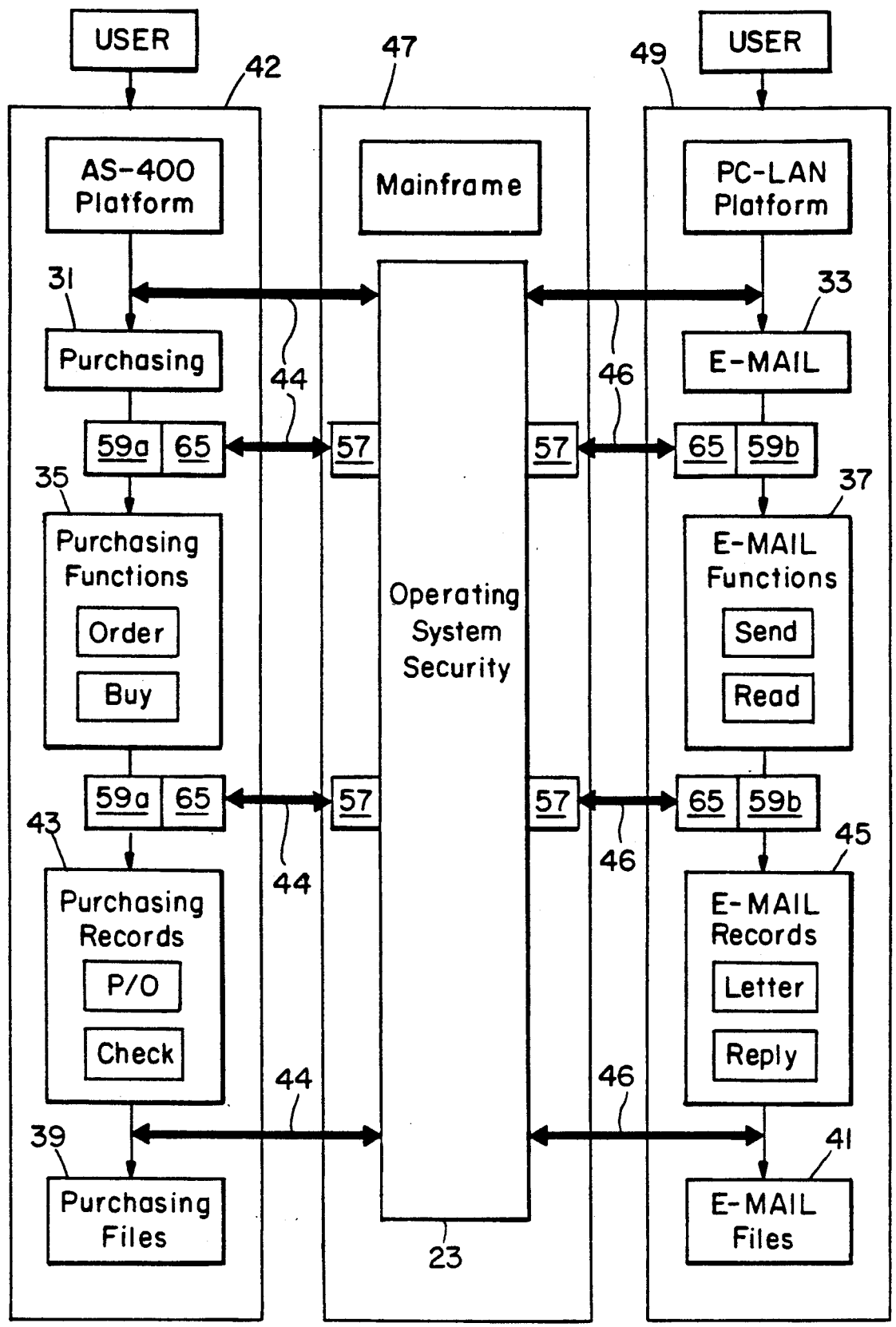
FIG. 4 is a schematic diagram of operating system security apparatus of the present invention on a mainframe serving as a security server.

The foregoing examples illustrated in FIGS. 2 and 3 show security integration of the present invention as applied to one or multiple applications running on the same mainframe computer. Where plural applications run on devices networked to the mainframe (e.g., personal and minicomputers) as well as the mainframe, the mainframe performs the role of a security server which distributes security functionality to all of the plurality of applications running on diverse platforms. FIG. 4 is illustrative.

In FIG. 4 a mainframe 47 has an operating system security 23 which employs the security integration apparatus of the present invention. Networked to the mainframe 47 over a local area network configuration (LAN) are PCs 49. Also networked to mainframe 47 are computers 42 of platforms (operating systems) different than the PC-LAN platform. Each of the two different platforms 42, 49 support respective applications, for instance the purchasing application 31 and E-mail application 33 from FIG. 3.

As in Example II of FIG. 3, each of these applications 31, 33 and the applications running on mainframe 47 have a respective application control component 59 which intercepts security processing by the respective application security in response to requests for accessing respective application-specific functions 35, 37 and records 43, 45. Each respective application control component 59 then interprets the security processing of the respective application security and from the interpretation establishes parameters for forming parameter lists 65. The different application control components 59 corresponding to applications 31 running on one platform 42 pass respective formed parameter lists 65 across network lines 44 to the operating system security interface 57 to invoke respective "verify" calls. Similarly, the different application control components 59 corresponding to applications 33 running on the PC-LAN platform 49 pass respective formed parameter lists 65 across LAN lines 46 to operating system security interface 57 to invoke respective "verify" calls.

In response, the operating system security interface 57 formats pertinent calls to the operating system security 23 for accessing the requested application-specific information. The operating system security 23 responds with an allowance or denial of access which the operating system security interface 57 passes back (returns) to the requesting application control component 59 in the respective parameter list 65. The parameter list indicates address of the requesting application so that the operating system security interface 57 transmits security control signals over the proper network lines 44, 46. As such, the mainframe (and its operating system security software) functions as a "server" of security control. Based on the returned results, the application control component 59 enforces pertinent access or modifies program flow of the associated application.

Global access to applications 31, 33 running on platforms different from each other and different from mainframe 47 and access to master files 39, 41 of respective applications 31, 33 is provided through the operating system security 23 as discussed in FIGS. 1 and 2 with the addition of the operating system security 23 determining on which network lines 44, 46 respective access signals are to be transmitted.

Accordingly, mainframe 47 employing system security 23 of the present invention functions as a security server distributing security processing to various applications running on different platforms 42, 49 networked to the mainframe 47.

Equivalents

While the invention has been particularly shown and described with reference to a preferred embodiment thereof, it will be understood by those skilled in the art that various changes in form and details may be made therein without departing from the spirit and scope of the invention as defined by the appended claims.

What is claimed is:

1. In an operating system of a computer for supporting execution of at least one application, each application having a respective application security means for controlling access of application specific functions and records, the operating system having an operating system security means separate from the each of the application security means, the improvement comprising a computer system security apparatus for bypassing the application security means and controlling access of each application and application-specific functions and records through the operating system security means.

2. The improvement of claim 1 wherein the computer system security apparatus includes:
   for each application supported by the operating system, an application control member that intercepts and pre-empts security processing by the application security means of the application; and
   an interface member between each application control member and the operating system security means, the interface member providing security processing through the operating system security means in response to an application control member pre-empting security processing by the application security means.

3. The improvement of claim 2 wherein the computer system security apparatus further comprises a parameter list coupled between the interface member and an application control member for providing security processing information including addresses of desired application functions and records.

4. The improvement of claim 1 wherein the computer system security apparatus includes a customization file for indicating applications, application-specific functions and records to which access is controlled through the operating system security means.

5. In a computer system having (i) a digital processor, and (ii) a plurality of applications, each application having (a) respective application-specific information, and (b) application security means for controlling access to the respective application-specific information, computer system security apparatus comprising:
   an operating system having an operating system security means for controlling access to applications; and
   a security integration assembly coupled to the operating system for extending control by the operating system security means to control access to desired application-specific information, in substitution of application security means control of access to application-specific information, the security integration assembly preempting the application security means such that the operating system security means effectively controls access to desired application-specific information as well as applications.

6. Apparatus as claimed in claim 5 wherein each application of the plurality of applications is executed on at least one of the digital processor and a computer coupled to the digital processor.

7. Apparatus as claimed in claim 5 wherein the security integration assembly extends control of the operating system security means to control access to application-specific records and functions.

8. Apparatus as claimed in claim 5 wherein the security integration assembly includes:
   for each application supported by the operating system, an application control member that intercepts and interprets security processing by the application security means of the application, and
   an interface member between each application control member and the operating system security means, the interface member providing security processing through the operating system security means in response to an application control member intercepting security processing by the application security means.

9. Apparatus as claimed in claim 8 wherein the security integration assembly further includes a parameter list coupled between the interface member and an application control member for providing security processing information including addresses of desired application-specific information.

10. Apparatus as claimed in claim 5 further comprising a customization file coupled to the security integration assembly for indicating applications and application-specific information to which access is controlled through the operating system security means.

11. In a computer system supporting execution of a plurality of user-programs and having an operating system with an operating system security means for controlling global access of user-programs, each user-program having application security means separate from the operating system security means for controlling access to application-specific information of the user-program, a method of providing computer system security comprising the steps in the computer system of:
   extending control of the operating system security means to control access of application-specific information of each user-program in addition to controlling global access of each user-program; and
   substituting the extended control of the operating system security means for the control of access to application-specific information by application security means, such that the operating system security means effectively controls both global access of user-programs and access of application-specific information of each user-program.

12. A method as claimed in claim 11 wherein the step of extending control of the operating system security means includes:
   for each user-program, providing an application control member that interprets security processing by the application security means in controlling access to application-specific information, each application control member establishing parameters for accessing user requested application-specific information; and
   passing the parameters established by the application control members to an interface member coupled between the operating system security means and each application control member, and in response to the passed parameters, the interface member providing security processing through the operating system security means.

13. A method as claimed in claim 12 wherein the step of substituting the extended control of the operating system security means for the control by the application security means includes intercepting and pre-empting security processing of the application security means of a user-program with the application control member provided for that user-program.

14. A method as claimed in claim 11 further comprising the step of:
particularizing extent of control of the operating system security means according to user-program and application-specific information.

* * * * *

UNITED STATES PATENT AND TRADEMARK OFFICE
CERTIFICATE OF CORRECTION

PATENT NO. : 5,305,456
DATED : April 19, 1994
INVENTOR(S) : George A. Boitano

It is certified that error appears in the above-identified patent and that said Letters Patent is hereby corrected as shown below:

Title page, item [19] and [75] change inventor's name form "Boitana" to Boitano".

Signed and Sealed this

Twenty-sixth Day of January, 1999

Attest:

Attesting Officer

*Acting Commissioner of Patents and Trademarks*